United States Patent Office 3,499,871
Patented Mar. 10, 1970

3,499,871
COPOLYMER OF FORMALDEHYDE AND
ACETALDEHYDE
Maurice J. A. Letort, Paris, and Bernard Fleureau,
Lepercq-Verneuil-en-Halatte, Oise, France, assignors to Charbonnages de France, Paris, France,
a public institution of France
No Drawing. Filed Dec. 29, 1960, Ser. No. 79,182
Claims priority, application France, Apr. 23, 1960,
825,168/60
Int. Cl. C08f 3/40
U.S. Cl. 260—67                                6 Claims Formaldehyde is readily solution polymerized in the presence of catalysts. The first experiments are attributed to Staudinger, who carried out the polymerization in ethyl ether at about −80° C. in the presence of boron trichloride or trimethylamine. It is now known that many other solvents can be used and that many compounds having very different structures can act as polymerization catalysts; among the latter, amines and their derivatives such as quarternary ammonium salts, give very good results.

The thus-obtained polymers have a fairly poor thermal stability, but the latter can be notably improved by an acylating reaction of the hydroxyl groups present in the molecule. A specific feature of polyformaldehydes is their insolubility in most organic solvents. Thus, they cannot be dissolved in chlorophenol, which is their best solvent, at a temperature lower than 60° C.

For some purposes however, it would be desirable to provide more soluble products.

It is moreover known that it is possible to obtain high-polymers of acetaldehyde the physical characteristics of which are very different from those of polyformaldehydes. They are soluble in many solvents and have resilient properties but, unfortunately, they have a low thermal stability. Accordingly, it could be thought that copolymers of acetaldehyde and formaldehyde should combine the advantageous features of each of these homopolymers.

Staudinger has already attempted, under laboratory conditions, to carry out formaldehyde polymerization using acetaldehyde as a solvent (see Staudinger, die "Hochmolekularen Organischen Verbindungen," Berlin 1932, page 286). The product obtained from this experiment is described as being a glassy resilient EU-polyoxymethylene, which becomes hard and brittle as it gradually loses the acetaledhyde.

Thus, the experiment described by Staudinger is not suitable for producing a useful formaldehyde and acetaldehyde copolymer.

Now, the present invention provides formaldehydes and acetaldehyde copolymers suitable for industrial uses due to their specific properties, such as mechanical properties, thermal stability, as well as solubility in organic solvents and advantageous features of resiliency.

The new products of the invention are copolymers of formaldehyde and acetaldehyde having repeating units of

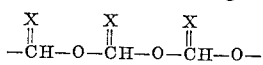

(wherein $x$ is intermixed H and CH), of high molecular weight, the solubility in organic solvents of which is higher than that of polyformaldehydes.

The invention further provides stable and resilient thermoplastic high copolymers of formaldehyde and acetaldehyde, the solubility in organic solvents of which is also higher than that of polyformaldehydes.

Another object of the invention is to provide solutions in organic solvents of all the aforesaid products.

Finally, the invention provides a process for obtaining such products.

Broadly, this process comprises chemically reacting acetaldehyde on formaldehyde in an anhydrous liquid reaction medium containing acetaldehyde, in the presence of a formaldehyde-polymerization catalyst.

The invention further provides the stabilization by acylation of the thus-obtained products.

According to a convenient embodiment of the process, formaldehyde monomer is continuously fed into the reaction medium.

Preferably, the formaldehyde monomer is continuously fed into the reaction medium with continuous stirring.

It is highly advantageous that the formaldehyde monomer should be substantially pure and anhydrous.

According to a specific embodiment, the reaction medium is a solution of acetaldehyde.

In accordance with a further embodiment, the reaction medium is pure acetaldehyde.

If the product is to be stabilized by an acylation reaction, this is preferably carried out by treating the acetaldehyde-formaldehyde copolymer with acetic anhydride in the presence of pyridine.

Further advantages and features of this invention will become apparent from the following description, and the following examples given merely by way of explanation and without any intention of limiting the invention.

Formaldehyde results from the thermal decomposition of commercial paraformaldehyde at a temperature of about 150° C. The gas from the pyrolysis is drawn by a nitrogen stream into the reactor, after having passed in traps cooled to about −15° C. where any water present is condensed and a part of the formaldehyde is polymerized. The monomer obtained under such conditions has a purity of 99.9%.

It is to be understood that any method of producing pure gaseous formaldehyde can be used.

The crude acetaldehyde is carefully distilled in a packed column.

All these operations are carried out under nitrogen which has been purified by passing it over copper dispersed in kieselguhr heated to 180° C., and thereafter dried.

The vessel in which acetaldehyde is collected must be perfectly air-tight; all operations are conducted so as to avoid any contact between atmospheric oxygen and the monomer which, if it is not be used immediately after the distillation step, is stored in the dark at a temperature of −78° C.

The formaldehyde monomer, carried, if desired, by an inert gas stream such as nitrogen, is fed into the upper portion of the reactor. The reaction chamber is maintained at the desired temperature by means of a heat-control bath; it contains the acetaldehyde either pure and liquid or dissolved in an inert solvent such as a hydrocarbon. Hydrocarbons suitable for this purpose can be, for example, aliphatic or cyclic hydrocarbons which are liquid at the temperature and pressure selected for the reaction.

The polymerization initiator is added to the reaction liquid. This initiator can be an amine or a derivative such as quaternary ammonium salt or any other suitable compound. Vigorous stirring is necessary in order to promote the dissolution of the formaldehyde and also to disperse the copolymer which is precipitated as it forms.

This copolymer is isolated by filtration, washed first with a hydrocarbon and then with acetone, and thereafter vacuum dried. If desired the copolymer is thereafter stabilized by acylating as will be described in the following examples, wherein the parts mentioned are parts by weight:

EXAMPLE I

Gaseous formaldehyde is prepared as described above and fed into acetaldehyde cooled to −78° C. (500 parts) in which 0.05 part of tributylamine has been dissolved.

56 parts of paraformaldehyde are thereby depolymerized in 75 minutes and continuously fed into the reactor. 45 parts of copolymer are then obtained which is washed with petroleum ether, then with acetone and thereafter vacuum dried.

The melting point of the copolymer is 140° C.

Quantative analysis shows that it contains 15 molecules of acetaldehyde for 100 molecules of formaldehyde.

It is in the form of a non-sticky white powder, which begins to decompose at a temperature of 80° C. This temperature, hereafter called "decomposition temperature," is determined as follows:

100 mg. of copolymer are placed into a boat and introduced into a furnace the heating rate of which is carefully controlled; all these tests have been carried out with a heating rate such as to give a uniform rise in temperature of 2° C. per minute.

An appropriate system enables the graph showing the weight of the sample remainder as a function of the temperature to be directly recorded over the period of duration of the heating.

The decomposition temperature is defined as being that temperature at which the sample has lost 0.025% of its original weight.

25 parts of this copolymer are introduced into a mixture comprising 40 parts of pyridine and 200 parts of acetic anhydride. This is heated under nitrogen for 2 hours at 120° C. The copolymer dissolves, but is again precipitated on cooling. A washing step is carried out and 15 parts of a copolymer are collected whose decomposition temperature is 195° C.

This copolymer can be molded into a film between two polished metal plates heated at 160° C. under a pressure of 200 kg./cm.$^2$. The thus-obtained film is strong and can be bent backwards and forwards several times without breaking. This product is also suitable for making articles by an injection molding process of for making shaped articles by an extrusion process.

EXAMPLE 2

The vapour produced from 25 parts of trioxane is drawn during 10 minutes by a nitrogen stream over pumice containing phosphoric acid, heated to 220° C. At the furnace outlet the gas is passed through traps cooled to 0° C. and to —15° C. The thus-obtained formaldehyde is fed into a reactor containing 125 parts of acetaldehyde in 125 parts of heptane maintained at 0° C. and a catalyst comprising 0.05 part of tributylamine. 8.5 parts of a copolymer having a melting point of 120° C. are recovered.

The thus-obtained copolymer can be molded as in Example 1, but at a temperature of 140° C.

EXAMPLE 3

The conditions are the same as in Example 1 but using a mixture of 88 parts of acetaldehyde and 88 parts of heptane.

21 parts of a non-sticky, resilient copolymer having a melting point of 100° C. are obtained.

Quantitative analysis shows that this copolymer contains 37 molecules of acetaldehyde for 100 molecules of formaldehyde.

Following acetylating under the same conditions as in Example 1, the recovered copolymer has a decomposition temperature of 165° C.

The thus-obtained copolymer can be molded at 120° C. to give flexible articles such as tubing, sheeting and wiring.

EXAMPLE 4

Example 1 is repeated but with a bath at 0° C. and using a catalyst comprising 0.003 part of cetyldimethylbenzylammonium bromide.

31 parts of a copolymer having a melting point of 140° C. and which is similar to that of Example 1 are recovered.

This copolymer also gives a molded article similar to that of Example 1.

EXAMPLE 5

0.1 part of the acetylated or non-acetylated copolymer obtained in Example 1 is introduced into 5 parts of pyridine which is progressively heated with continuous stirring. At 65° C. the copolymer dissolves to give a clear and viscous solution.

EXAMPLE 6

0.1 part of the acetylated or non-acetylated copolymer obtained in Example 1 is introduced into 5 parts of dimethylformamide under the same conditions as in Example 5; at 59° C., a clear and viscous solution of the copolymer is obtained.

EXAMPLE 7

0.1 part of the non-acetylated copolymer of Example 3 is introduced into 5 parts of pyridine which is progressively heated while stirring. The copolymer dissolves at 60° C. to give a clear and viscous solution.

The solution of Examples 5, 6 and 7 can be used for binding together various plastic or elastic materials and in particular those obtained from the copolymers of the invention.

EXAMPLE 8

In two hours, 200 parts of gaseous trioxane is decomposed by passing it with a stream of nitrogen, over pumice containing phosphoric acid heated to 220° C. On leaving the heating zone, the gas is passed into traps cooled to 0° C. and to —20° C. before being sent into a reactor maintained at —78° C. and containing 200 parts of propane, 100 parts of acetaldehyde and a catalyst comprised of 0.006 part of diphenylamine and 0.003 part of tributylamine.

After washing with water and then with acetone, 38 parts of a copolymer containing 4% by weight of acetaldehyde and having a melting point of 150° C. were obtained.

Various articles such as bars, plates, etc., can be manufactured from this copolymer after grinding at 170° C. under a pressure of 200 kg./cm.$^2$.

EXAMPLE 9

0.1 part of this copolymer is introduced into 5 parts of pyridine. This is heated progressively while stirring. The polymer dissolves to give a clear, viscous solution on reaching 75° C. It can be used for binding plastic material and, in particular, formaldehyde-acetaldehyde copolymers.

EXAMPLE 10

The formaldehyde monomer is prepared under the same conditions as in Example 2. The vapours are sent into a reactor maintained at —78° C. and containing 200 parts of a mixture of 140 parts of acetaldehyde and 60 parts of pentane. The polymerization catalyst consists of 0.05 part of tributylamine.

After two hours, 3.5 parts of a copolymer, in the form of resilient granules, are obtained which are washed with petroleum ether. The acetaldehyde content is 48% by weight and the melting point is 95° C.

Flexible articles such as bars, plates, etc., can be obtained by grinding, for example, by compression at 110° C. under 200 kg./cm.$^2$.

EXAMPLE 11

One part of this copolymer introduced into 10 parts of chloroform dissolves, after 24 hours at ambient temperature, to give a clear and viscous solution from which films may be obtained by evaporation of the chloroform solvent. It can also be used as an adhesive.

EXAMPLE 12

7 parts of a copolymer containing 48% by weight of acetaldehyde are dissolved in 70 parts of pyridine at ambient temperature over a period of about one hour and then an equal volume of acetic anhydride is added. The solution is stirred at ambient temperature under a nitrogen atmosphere for a period of 24 hours. After this period the copolymer is precipitated from the solution by adding a saturated solution of sodium carbonate. This precipitate is washed with water then dried in air. The decomposition temperature ranges from 95° C. for the initial copolymer to 155° C. for the acetylated copolymer.

EXAMPLE 13

The copolymer of the preceding example dissolves instantaneously in acetone at ambient temperature to give a clear solution from which films can be obtained by evaporating the acetone solvent.

The proportions of either of the constituents of the copolymer can vary from 0.5% to 99.5% by weight of the copolymer. It was found that with increasing percentage of acetaldehyde in the copolymer, the copolymer became more elastic. With acetaldehyde content of between 0.5% and about 10% by weight of the copolymer, a rigid copolymer is obtained. With acetaldehyde content of between 10% to about 25–30%, the resulting copolymer is semi-rigid. With acetaldehyde contents beyond 30% of the copolymer by weight the resulting copolymer was found to be elastic.

It is to be understood that this invention has just been described and exemplified merely by way of explanation and that any useful modifications can be made therein within the spirit of the invention without falling outside its scope.

We claim:

1. A process for producing a stable resilient thermoplastic high copolymer of formaldehyde and acetaldehyde, soluble at ambient temperature in organic solvents selected from the group consisting of pyridine, chloroform and acetone; comprising continuously feeding anhydrous formaldehyde monomer into a reaction zone maintained at a temperature of from −78° C. to 0° C. and containing a stirred liquid medium including acetaldehyde and a formaldehyde-polymerization catalyst selected from the group consisting of diphenylamine, tributylamine and cetyldimethylbenzylammonium bromide, continuously separating the precipitate produced as it precipitates from said liquid medium, removing said precipitate and submitting said precipitate to a processing step including washing and drying.

2. A process for producing a stable resilient thermoplastic high copolymer of formaldehyde and acetaldehyde, soluble at ambient temperature in organic solvents selected from the group consisting of pyridine, chloroform and acetone; comprising continuously feeding, under an inert atmosphere, anhydrous formaldehyde monomer into a reaction zone maintained at a temperature of from −78° C. to 0° C. and containing a stirred liquid medium comprising pure liquid acetaldehyde with a formaldehyde-polymerization catalyst dissolved therein said catalyst being selected from the group consisting of diphenylamine, tributylamine and cetylidimethylbenzylammonium bromide, continuously separating the precipitate produced as it precipitates from said liquid medium, removing said precipitate and submitting said preciptate to a processing step including washing and drying.

3. A process for producing a stable resilient theremoplastic high copolymer of formaldehyde and acetaldehyde, soluble at ambient temperature in organic solvents selected from the group consisting of pyridine, chloroform and acetone; comprising continuously feeding, under an inert atmosphere, anhydrous formaldehyde monomer into a reaction zone maintained at a temperature of from −78° C. to 0° C. and containing a stirred liquid medium comprising acetaldehyde in an inert organic liquid with a formaldehyde-polymerization catalyst dissolved therein said catalyst being selected from the group consisting of diphenylamine, tributylamine and cetyldimethylbenzylammonium bromide, continuously separating the precipitate produced as it precipitates from said liquid medium, removing said precipitate and submitting said precipitate to a processing step including washing and drying.

4. A process according to claim 3 in which said inert organic liquid is a hydrocarbon of the group consisting of saturated aliphatic hydrocarbons.

5. A process for producing a stable resilient thermoplastic high copolymer of formaldehyde and acetadehyde, soluble at ambient temperature in organic solvents selected from the group consisting of pyridine, chloroform and acetone, comprising continuously feeding anhydrous formalde hyde monomer into a reaction medium containing acetaldehyde, an inert organic liquid and a formaldehyde-polymerization catalyst selected from the group consisting of diphenylamine, tributylamine and cetyldimethylbenzylammonium bromide, the ratio by weight of acetaldehyde to said inert organic liquid to the catalyst being as: 100: from 0 to 200: from 0.0006 to 0.04, said reaction medium being maintained at a temperature of from −78° C. to 0° C. and being stirred, separating the precipitate produced as it precipitates from said medium, washing said precipitate and thereafter drying it, thus giving a copolymer product, the ratio of said copolymer product to said acetaldehyde used being, by weight, as from 3.5 to 38:100, the melting point of said copolymer product being higher than 95° C.

6. A process for producing a stable resilient thermoplastic solid resinous copolymer of formaldehyde and acetaldehyde, soluble at ambient temperature in organic solvents selected from the group consisting of pyridine, chloroform and acetone, comprising reacting anhydrous formaldehyde monomer and acetaldehyde in a liquid medium containing a formaldehyde-polymerization catalyst selected from the group consisting of diphenylamine, tributylamine and cetyldimethylbenzylammonium bromide in a reaction zone maintained at a temperature of of from −78° C. to 0° C., separating the precipitate produced from said liquid medium, removing said precipitate and submitting said precipitate to a processing step including washing and drying.

References Cited

UNITED STATES PATENTS

| 2,162,616 | 6/1939 | Herrmann | 260—67 |
| 2,274,749 | 3/1942 | Smyers | 260—67 |
| 2,768,994 | 10/1956 | MacDonald. | |
| 2,964,500 | 12/1960 | Jenkins et al. | |
| 2,998,409 | 8/1961 | Nogare et al. | |
| 3,001,966 | 9/1961 | Funck et al. | 260—67 |
| 3,043,803 | 7/1962 | Lewis et al. | 260—67 |

FOREIGN PATENTS

| 220,367 | 3/1962 | Austria. |
| 349,556 | 5/1931 | Great Britain. |
| 783,458 | 9/1957 | Great Britain. |
| 876,956 | 9/1961 | Great Britain. |

WILLIAM H. SHORT, Primary Examiner

L. M. PAYNES, Assistant Examiner

U.S. Cl. X.R.

260—30.2, 32.8, 33.8